Patented July 8, 1952

2,602,797

UNITED STATES PATENT OFFICE 2,602,797

3-AMINO-10-METHYL- 9 -p-CARBALKOXY-AMINOPHENYL PHENANTHRIDINIUM SALTS AND METHOD FOR THEIR PRODUCTION

Leslie Percy Walls, London, England, assignor to Burroughs Wellcome & Co. (U. S. A.) Inc., Tuckahoe, N. Y., a corporation of New York No Drawing. Application November 1, 1949, Serial No. 124,950. In Great Britain November 3, 1948

4 Claims. (Cl. 260—286)

1

This invention comprises improvements in or relating to the manufacture of phenanthridine compounds.

It is well known that many phenanthridinium salts have a powerful trypanocidal action, which is particularly marked in infections due to T. Congolense. Other species of trypanosome, e. g. T. rhodesiense and T. cruzi are likewise affected by such compounds, but with the latter (the causative organism of the South American form of trypanosomiasis known as Chagas' disease) they have hitherto been of little clinical value. This is probably due to the fact that T. cruzi is a tissue invasive organism. It has now been found by research and experiment that phenanthridinium salts of a special type (having the general formula IV shown below) are of particular value in T. cruzi infections. Their particular features are that ring B contains a primary amino-group in the 3-position, that ring C contains an urethane group, in which R is alkyl, in the p-position and that X is an anion, for example a chloride or ethanesulphonate anion.

These compounds are obtained, in accordance with our invention, by the cyclization of the corresponding nitro substituted amides of general formula I, below given, preferably by heating them with phosphoryl chloride, followed by successive quaternization and reduction of the product

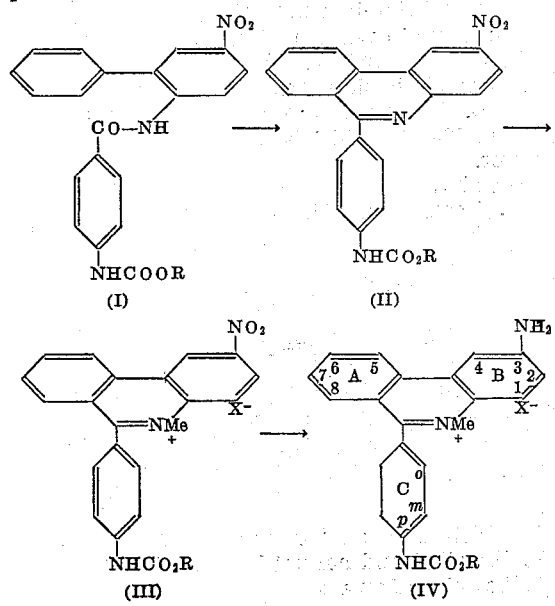

2

It has been found that the cyclization process is particularly smooth, requiring often only one hour at 100° C. and affording a high yield of the phenanthridine (II). Hydrolysis of this product for example with sulphuric acid converts it into a nitroamine, which readily reacts with alkyl chloroformates to give various other urethanes. These may then be quaternized and reduced by customary methods of quaternization and reduction. Salts containing an anion different from that initially obtained in the quaternization may be prepared by a double decomposition with a suitable metallic salt of the desired anion in a conventional manner.

Likewise the quaternary salt (III) may similarly be hydrolyzed to a nitro-amino-salt, the latter be then reacted with alkyl chloroformates, and the products of this reaction be then reduced.

These various methods all yield salts of the type (IV).

The invention will be more clearly understood from consideration of the following illustrative examples.

Example 1

A solution of 5-nitro-2-aminodiphenyl (14.5 grams) in hot chlorobenzene (70 milliliters) is treated with p-carbethoxyaminobenzoyl chloride (14.5 g.). After one hour at the boil evolution of hydrogen chloride has ceased, and with cooling 5 - nitro - 2 - carbethoxyaminobenzamidodiphenyl crystallizes in almost white plates (25 g.), melting point 207° C. This substance (12. g.) and phosphoryl chloride (24 ml.) are heated on the steam-bath for one hour, when vigorous effervescence occurs with evolution of hydrogen chloride. The solid product is isolated by cautious decomposition of the reaction mixture with ice-water, followed by treatment with hot aqueous sodium carbonate solution. It consists of over 60% 3-nitro-9-p-carbethoxyaminophenyl-phenanthridine, which can be obtained in deep yellow needles, decomposing on heating to 250° C., by crystallization from acetone. More conveniently phosphoryl chloride is removed from the reaction mixture by distillation under reduced pressure, and the residue refluxed with chloroform (60 ml.) until all the gum has dissolved. On addition of hydrochloric acid (12 ml.) a solid hydrochloride is precipitated, which is collected by filtration, washed with chloroform, and then heated with hot 2% aqueous sodium carbonate, being thus converted into practically pure 3-nitro-9-p-carbethoxyamino-phenylphenanthridine.

The crude product (12 g.) is hydrolyzed by sulphuric acid (24 ml. concentrated acid and 12 ml. water) at 140° C. for one hour. On dilution with water (75 ml.) the acid sulphate of the amine crystallizes in buff plates, which may be converted into the base (8 g.) by heating with aqueous ammonia. The product 3-nitro-9-p-aminophenylphenanthridine crystallizes from nitrobenzene in orange needles, melting point 297° C.

*Example 2*

3-nitro-9 - p - carbethoxyaminophenylphenanthridine (1 g.) is quaternized in nitrobenzene solution (10 ml.) with methyl sulphate (0.5 ml.) at 170° C. for 5 minutes. The quaternary salt, 3-nitro-9-p-carbethoxyaminophenyl - 10-methylphenanthridinium methylsulphate, separates from the reaction mixture and may be purified by crystallization from boiling water. The brown plates (0.95 g.) thus obtained decompose at 240° C. A neutral hot aqueous solution of this salt is reduced by freshly prepared ferrous hydroxide to 3-amino-9-p-carbethoxyaminophenyl-10-methylphenanthridinium methylsulphate, which after distillation of the filtrate to small bulk crystallized in large brownish-yellow plates, decomp. 250° C. Addition of sodium chloride to the filtrate from the reduction mixture causes the corresponding chloride to crystallize. It is a rather sparingly soluble salt, which crystallizes in transparent yellow prisms; decomposition begins at 220° C. By double decomposition in aqueous solution with silver ethanesulphonate the corresponding ethanesulphonate, which is much more soluble, is obtained in deep yellow prisms, decomposing at 290° C.

Similar double decomposition of the chloride and silver sulphate in methanol furnishes the corresponding sulphate (type $B_2SO_4$), which crystallizes from methanol in yellow prisms, decomp. 252° C. This salt has a solubility in water of over 20% at room temperature.

*Example 3*

3-nitro-9-p - carbethoxyaminophenyl-10-methylphenanthridinium methylsulphate (1 g.) described in the previous example, is hydrolyzed by sulphuric acid (2 ml. acid, 1 ml. water), at 140° C., diluted with water, and neutralized. The salt that separates is dissolved in water and sodium chloride is added: 3-nitro-9-p-aminophenyl-10-methylphenanthridinium chloride crystallizes in purple plates, which begin to decompose at 222° C. When a hot aqueous solution of this salt is shaken with n-propyl chloroformate, 3-nitro-9-p-carbopropoxyaminophenyl- 10 -methylphenanthridinium chloride crystallizes in brown plates, but a better yield is obtained when the reaction is conducted in methyl alcoholic solution. By precisely similar processes to those described in Example 2 this salt is converted into 3-amino-9-p-carbopropoxyaminophenyl- 10 -methylphenanthradinium ethanesulphonate, a salt of indefinate melting point which crystallizes from water in small yellow plates.

These compounds were also prepared by an alternative route. A solution of p-aminobenzoic acid (11 g.) in ethanol (44 ml.) was refluxed with diethylaniline (14 ml.) and n-propyl chloroformate (9.5 ml.) for 30 minutes. On pouring the solution into normal hydrochloric acid p-carbopropoxyaminobenzoic acid (14 g.) was precipitated, which crystallized from aqueous ethanol in white needles, M. P. 195° C. This acid (12 g.) and thionyl chloride (12 ml.) were refluxed for 2 hours, excess thionyl chloride then distilled off and the residue of acid chloride added to a solution of 5-nitro-2-aminodiphenyl (14 g.) in chlorobenzene (60 ml.). After 1 hour under reflux the solution was cooled, so that 5-nitro-2-p-carbopropoxyaminobenzamidodiphenyl (20 g.) crystallized; it was recrystallized from glacial acetic acid in slightly discolored needles, M. P. 195°.

By the method described in Example 1 this substance was converted into 3-nitro-9-p-carbopropoxyaminophenanthridine, which crystallized from aqueous pyridine in yellow needles, M. P. (efferv.) 265°. The methylsulphate, prepared by the method of Example 2, crystallized from water or ethanol in light brown prisms, decomp. 244°. This salt is hydrolyzed to 3-nitro-9-p-aminophenyl-10-methylphenanthridinium chloride, and reduced to 3-amino-9-p-carbopropoxyaminophenyl-10-methylphenanthridinium chloride by the methods just described.

*Example 4*

3-nitro-9-p-aminophenylphenanthridine (4 g.) is suspended in acetone (200 ml.) containing diethylaniline (4 ml.) and methyl chloroformate (2 ml.) and refluxed until the orange base disappears (about 1 hour). With cooling 3-nitro-9-p-carbomethoxyaminophenylphenanthridine crystallizes in yellow needles (4 g.), decomposing at 264° C. By the same method the corresponding carboisopropoxy-compound is obtained, and both may be successively quaternized and reduced by the methods described in Example 2. 3-amino-9-p-carbomethoxyaminophenyl- 10 -methylphenanthridinium chloride crystallizes from water in brownish-yellow prisms, decomposing at 290° C., and 3-amino-9-p-carboisopropoxyaminophenyl-10-methylphenanthridinium ethanesulphonate in large brownish-yellow prisms, decomposing at 175° C.

By similar methods using n-butyl chloroformate 3-nitro - 9 - p - carbobutoxyaminophenylphenanthridine, M. P. (efferv.) 251°, was obtained, which was converted into the methylsulphate (bronze-colored plates from ethanol, decomp. 245° C.). 3-amino-9-p-carbobutoxyaminophenyl-10-methylphenanthridinium methylsulphate crystallized from water in yellow plates, M. P. (efferv.) 197°. The very sparingly soluble chloride crystallized from water in deep yellow prisms, unmolten at 300° C. The sulphate formed brown prisms, decomp. 295° C., which are much more soluble in water.

I claim:
1. A compound of the formula:

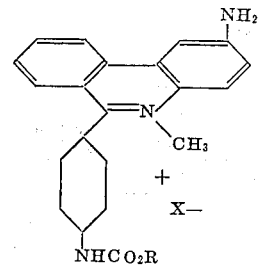

in which R is selected from the class consisting of the ethyl and normal butyl radicals, and X— is the anion of an acid.

2. Salts of the formula:

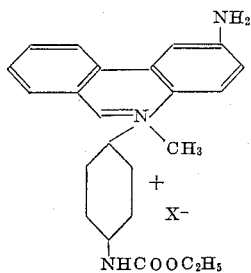

in which X⁻ is an anion.

3. Salts of the formula:

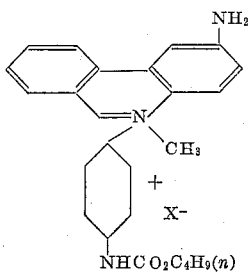

in which X⁻ is an anion.

4. The process of preparing a 3-amino-10-methyl-9-p-carbethoxyaminophenyl phenanthridinium salt which comprises condensing 2-amino-5-nitrobiphenyl with p-carbethoxybenzoyl chloride, cyclizing the resultant amide with phosphorus oxychloride to give 3-nitro-9-carbethoxyphenyl phenanthridine, quaternizing this substance with a methylating agent and reducing the nitro group to yield the desired 3-amino-10-methyl-9-p-carbethoxyaminophenyl phenanthridinium salt.

LESLIE PERCY WALLS.

REFERENCES CITED

The following references are of record in the file of this patent:

UNITED STATES PATENTS

| Number | Name | Date |
|---|---|---|
| 2,397,391 | Walls | Mar. 26, 1946 |
| 2,452,001 | Walls | Oct. 19, 1948 |

OTHER REFERENCES

Walls: J. Chem. Soc. (London), 1946, pp. 1031–1033.